(12) United States Patent
Gueret et al.

(10) Patent No.: US 9,539,770 B2
(45) Date of Patent: Jan. 10, 2017

(54) FLEXIBLE MEMBRANE FOR THE PRODUCTION OF PARTS MADE FROM COMPOSITE MATERIALS

(75) Inventors: Sebastien Gueret, Le Havre (FR); Joel Breard, Saint Aubin sur Mer (FR)

(73) Assignee: UNIVERSITE DU HAVRE, Le Havre (FR)

( * ) Notice: Subject to any disclaimer, the term of this patent is extended or adjusted under 35 U.S.C. 154(b) by 1369 days.

(21) Appl. No.: 13/148,535

(22) PCT Filed: Feb. 5, 2010

(86) PCT No.: PCT/FR2010/000085
§ 371 (c)(1),
(2), (4) Date: Oct. 7, 2011

(87) PCT Pub. No.: WO2010/089479
PCT Pub. Date: Aug. 12, 2010

(65) Prior Publication Data
US 2012/0018089 A1   Jan. 26, 2012

(30) Foreign Application Priority Data

Feb. 9, 2009  (FR) ..................... 09 00550

(51) Int. Cl.
*B29C 35/08* (2006.01)
*B29C 70/44* (2006.01)
(Continued)

(52) U.S. Cl.
CPC ........... *B29C 70/44* (2013.01); *B29C 35/0805* (2013.01); *H05B 6/105* (2013.01); *B29C 35/0272* (2013.01); *B29C 2035/0811* (2013.01)

(58) Field of Classification Search
CPC ....... B29C 70/443; B32B 37/06; B32B 37/065
(Continued)

(56) References Cited

U.S. PATENT DOCUMENTS 4,563,145 A * 1/1986 de Meij ................. 425/174.8 R
5,240,542 A * 8/1993 Miller .................. B23K 13/015
156/272.4

(Continued)

FOREIGN PATENT DOCUMENTS

| FR | 2882682 | 9/2006 |
| FR | 2882683 | 9/2006 |
| FR | 2890588 | 3/2007 |

OTHER PUBLICATIONS

Johnson et al., "Flow control using localized induction heating in a VARTM process", Composites Science and Technology 67 (2007) 669-684, available online Jun. 21, 2006.*

(Continued)

*Primary Examiner* — Galen Hauth
(74) *Attorney, Agent, or Firm* — Brinks Gilson & Lione; G. Peter Nichols

(57) ABSTRACT

An embodiment relates to a molding device that may be used to produce a part made from a composite material. The molding device includes an inductive flexible membrane and an electrically conductive rigid portion. The inductive flexible membrane generates a magnetic field which creates eddy currents in the rigid portion, thereby creating a heat flow. This heat flow heats the part made from composite material by means of conduction.

13 Claims, 2 Drawing Sheets

(51) Int. Cl.
*H05B 6/10* (2006.01)
*B29C 35/02* (2006.01)

(58) Field of Classification Search
USPC .................. 425/174.8 R; 264/403, 486, 487
See application file for complete search history.

(56) References Cited

U.S. PATENT DOCUMENTS

| | | | | |
|---|---|---|---|---|
| 5,369,249 | A | * | 11/1994 | Kwon .................. H05B 6/1245 219/624 |
| 5,530,227 | A | * | 6/1996 | Matsen et al. ................. 219/633 |
| 2008/0128078 | A1 | * | 6/2008 | May ........................ B29C 73/10 156/272.4 |
| 2008/0211130 | A1 | * | 9/2008 | Rydin et al. .................. 264/102 |

OTHER PUBLICATIONS

Search Report for International Application No. PCT/FR2010/000085, European Patent Office, Jun. 22, 2010, pp. 3.

* cited by examiner

FLEXIBLE MEMBRANE FOR THE PRODUCTION OF PARTS MADE FROM COMPOSITE MATERIALS

PRIORITY CLAIM

The present application is a national phase application filed pursuant to 35 USC §371 of International Patent Application Serial No. PCT/FR2010/000085, filed Feb. 5, 2010; which further claims the benefit of French Patent Application Ser. No. 09/00550 filed Feb. 9, 2009; all of the foregoing applications are incorporated herein by reference in their entireties.

TECHNICAL FIELD

An embodiment relates to a deformable membrane for the production of parts made from composite materials, as well as to a molding device using such a deformable membrane.

BACKGROUND

Composite materials are constituted of at least two assembled immiscible components. They have properties that the various components that comprise it do not have separately. That is why composite materials are increasingly used, in all types of industries, as for example in aeronautics.

One of the main concerns in terms of composite materials consists in setting up devices and methods making it possible to produce composite materials of all sizes and of all shapes at low cost.

For this, for example French Patent Application FR2890588, which is incorporated by reference, is known which described a device for transforming composite materials using two rigid body moulds that are mobile in relation to one another, each body mould comprising a half-field inductor integral with the body mould and making it possible to heat the composite material. This device is advantageous because it makes it possible to reduce the heating and cooling times. However, it entails substantial investments in the tool as the two body moulds are specific to a shape of composite material. Moreover, the maintenance of the two body moulds is complicated and costly.

In order to limit investments, French Patent Application FR2882683, which is incorporated by reference, proposes to use a device comprising a rigid mould and a membrane playing the role of a counter-mould, a system of heating by means of induction being incorporated into the rigid mould. In this document, the method used is as follows:

heating of the prepreg to the melting temperature of the thermoplastic;
compression via the placing in a vacuum;
cooling of the entire device.

However this method requires the use of a rigid mould incorporating directly inductive coils specifically designed for a precise structure, which once again results in substantial investments for a specific form of composite material.

SUMMARY

An embodiment is a device for the shaping of composite material which does not require any expensive investments, which is easy to maintain, which is adapted to a large variety of shapes and sizes of composite materials, which makes it possible to use reinforcements of the prepreg, semipreg or dry type, which makes it possible to control the emanations of toxic vapors, which makes it possible to manufacture composite parts that have substantial structural characteristics without requiring the use of a press, autoclave or oven.

More precisely, an embodiment relates to a molding device for the production of parts made from composite materials comprising:
a deformable membrane;
a rigid portion;
a means of suction making it possible to apply a vacuum between the membrane and the rigid portion,
the molding device being remarkable in that:
the deformable membrane comprises at least one inductor, the inductor being connected to a power supply casing;
the rigid portion is at least partially electrically conductive.

Under the effect of the power supply casing, which comprises a generator and which produces an alternating current, the inductor produces a variable magnetic field. During the placing of the membrane on the rigid portion and its putting into operation, powerful eddy currents are formed directly in a portion of the membrane and of the rigid portion which then heat very quickly. This creation of heat in the rigid portion allows for a very fast rise in temperature by means of conduction of the material, as well as an optimum output in relation to other more conventional means such as heating resistances.

At the same time, the membrane, which is flexible, is thrust against the part made from composite materials and against the rigid portion thanks to the vacuum, and in this way, the part made from composite materials is compressed between the membrane and the rigid part. This makes it possible to have a final composite part that has a substantial rate of reinforcement. This step of compression can be improved by combining it with an outside pressure of the autoclave type.

The heating by means of conduction allows the part to reach its melting temperature very quickly, and to cool it very quickly subsequently, which makes it possible to reduce the cycle times during the production of the part and therefore to obtain productivity gains. But this increase in the heating speed also makes it possible to not place the heating membrane at a high temperature for too long in order to not deteriorate it.

An embodiment of this method of heating is genuinely advantageous as it makes it possible to heat effectively, and homogeneously, the part made from composite materials, regardless of its shape. Indeed, the inductor is no longer shaped for a geometry of a given part, but it adapts to the shape of the part made from composite materials since the membrane, and the inductor that it contains, are deformed in order to hug the shape of the rigid portion.

Moreover, an embodiment of this method of heating is highly effective, as it makes it possible to heat only the surface of the rigid portion which is arranged at a short distance from the membrane. Also note that this device is very economical and is very simple to implement as the deformable membrane is easy to manufacture and the rigid portion does not comprise any heating system.

Furthermore, this molding device with its suction member and its quick temperature cycle makes it possible to control the emanations of toxic vapors coming from chemical products located in the resin and/or the reinforcements during the heating thanks to the membrane providing a seal with regards to the outside environment. Indeed, these toxic vapors are sucked by the means of suction and can be treated before being discharged into the atmosphere. As such, with regards to the environment and the user, the molding device according to an embodiment favors conditions of hygiene and safety, in particular in terms of emissions of volatile organic compounds for example.

Advantageously, an embodiment of the inductor is constituted of at least one induction coil.

According to various embodiments:

The inductor is made of a metal of which the electrical resistivity is between $10^{-8}$ and $10^{-1}$ $\Omega$m. In this casing, the inductor may be constituted of one or several thin wires, for example of high-conductivity copper, which are incorporated into the body of the membrane. This embodiment is very simply to manufacture, inexpensive and effective since the copper wire or wires do not hinder the flexibility of the membrane;

The inductor is constituted of flexible ducts wherein an electrically conductive fluid circulates. In this embodiment, the ducts can be etched directly in the body of the membrane and the electrically conductive fluid, which is for example a ferrofluid, is injected into these ducts. In this way, the membrane is even more flexible than in the previous embodiment, which allows it to better hug the shapes of the rigid portion.

Advantageously an embodiment of the membrane is made from one of the materials taken from the following group: silicone, nylon, polyurethane, epoxy composite. These materials allow the membrane to be sufficiently flexible to be able hug any type of shape, while still being sufficiently resistant to be able to compress the part made from composite materials to be moulded, and this, even at the melting temperature of this part.

According to various embodiments:

the membrane is developable or non-developable and the inductor forms a coil included in the thickness of the membrane;

the membrane is a solid of any geometry (revolution solid, convex solid, concave solid, etc.) and the inductor forms a solenoid, which makes it possible on the one hand to have a better heating output and on the other hand to manufacture hollow bodies. In this casing, the tubular membrane may be placed in the cavity of the part to be manufactured, while the rigid portion is placed around the part, or according to another embodiment, the rigid portion may be placed in the cavity, while the membrane is placed around the part.

According to an embodiment, the membrane is elastic, which makes it possible to better hug the shape of the rigid portion, in particular when making hollow bodies.

According to an embodiment, the membrane further comprises electrically conductive particles, which also allows the membrane to heat. In this way, the heating of the part made from composite materials is more homogeneous, but at the same time, the membrane is directly heated and therefore it is possible to work at lesser melting temperatures.

Advantageously, an embodiment of the membrane further comprises means of cooling in order to further reduce the cooling times of the part to be shaped. These means of cooling may be channels etched in the body of the membrane and wherein a cooling fluid circulates, for example, water. The rigid portion may also comprise ducts wherein a cooling fluid circulates. The molding device according to an embodiment may also comprise an additional cooling device which injects a stream of air, for example over and under the device, quickly lowering the temperature of the composite by means of convection. Full consideration may be given to coupling these cooling devices in order to obtain a drop in temperature that is even faster.

In an embodiment, only the surface of the rigid portion is electrically conductive. In this way, only the surface of the rigid portion is heated which avoids unnecessary heating of the body of the rigid portion and therefore which reduces the thermal inertia.

Advantageously, an embodiment of the rigid portion comprises a thermally insulating layer arranged under the surface of the rigid portion which is electrically conductive, in order to increase the effectiveness of the heating device and the heat losses.

According to various embodiments:

the rigid portion is constituted of an electrically conductive material, the rigid portion is coated with an electrically conductive material, the rigid portion is constituted of a magnetic material, the rigid portion is coated with a magnetic material.

The use of a magnetic material makes it possible to increase the effectiveness of the heating.

Advantageously, the molding device according to an embodiment further comprises means of sealing making it possible to guarantee the seal between the membrane and the rigid portion when the means of suction applies a vacuum between the membrane and the rigid portion, in such a way that the membrane is solidly thrust against the rigid portion.

Advantageously, the molding device according to an embodiment comprises thermocouples making it possible to measure the temperature of the composite material and a frequency servo circuit of the power supply casing according to the temperature of the composite material.

Advantageously, the device according to an embodiment comprises means for applying vibrational movements to at least one of its constituents.

The molding device according to an embodiment is particularly adapted for the shaping of thermoplastic, or synthetic and/or natural thermosetting resins reinforced with synthetic and/or natural fibres such as flax or hemp. An embodiment is adapted very particularly to the implementation of these natural composites since the controlling of the heating temperature is optimal.

An embodiment may for example be used to implement the method described in French Patent Application FR2882682, which is incorporated by reference.

An embodiment is a method for molding a part made from composite materials implementing the molding device according to any one of the preceding embodiments, with the method comprising the following steps:

introducing a reinforcement and a matrix constituting the composite material in the molding device in the space between the rigid portion and the flexible membrane, applying a vacuum between the membrane and the rigid portion, applying a cycle for implementing consisting in supplying the inductor thanks to the power supply casing via a power and frequency controlled electric current.

The method of producing a composite material according to an embodiment is particularly advantageous because it consists in optimizing the temperature in the composite material thanks to a precise control of the frequency and of the power applied to the inductor so as to control the properties of the composite material obtained. In a method of the molding according to an embodiment, the control of the temperature is carried out thanks to the control of the frequency applied to the inductor. The controlling of this frequency makes it possible to control the heated zones: indeed, a very high frequency makes it possible to heat only the fibres of the composite, in the casing where they are conductive, and therefore have a very low thermal inertia. A lower frequency makes it possible to also heat the rigid portion and therefore to have a more substantial thermal inertia. Controlling the power of the current makes it possible to control the temperature of the composite. As such, the desired properties of the composite material are obtained via controlling the temperature in the composite material, while in the methods of prior art, they were obtained by controlling the pressure or the flow applied to the constituents of the composite material. For example, in a method according to an embodiment, the defect rate in the composite material may be controlled thanks to the frequency and the power of the electric current applied to the inductor.

Advantageously, an embodiment further comprises one or several of the following steps:
  a step of changing the pressure between the membrane and the rigid portion during the cycle for implementing;
  a step of applying a variable stress to the membrane during the cycle for implementing;
  a step of cooling of the composite material variable in temperature.

Advantageously, in an embodiment the frequency of the electric current varies during the cycle for implementing.

Advantageously, an embodiment of a method makes it possible to implement a composite material comprising fibres made of electrically conductive material. As such, during the installation of the membrane on the composite material and putting it into operation, powerful eddy currents are formed directly in the electrically conductive fibers. The fibers are therefore heated directly.

Advantageously, an embodiment of a method comprises:
  a step of increasing the power in order to provide for a rise in temperature;
  a step of maintaining the power in order to provide a constant temperature;
  a step of decreasing the power in order to provide a cooling of the part.

BRIEF DESCRIPTION OF THE DRAWINGS

Other characteristics and advantages of one or more embodiments shall appear when reading the following description, in reference to the annexed figures, which show.

For increased clarity, identical or similar elements are marked with identical reference signs on all of the figures.

DETAILED DESCRIPTION

Figure 1:
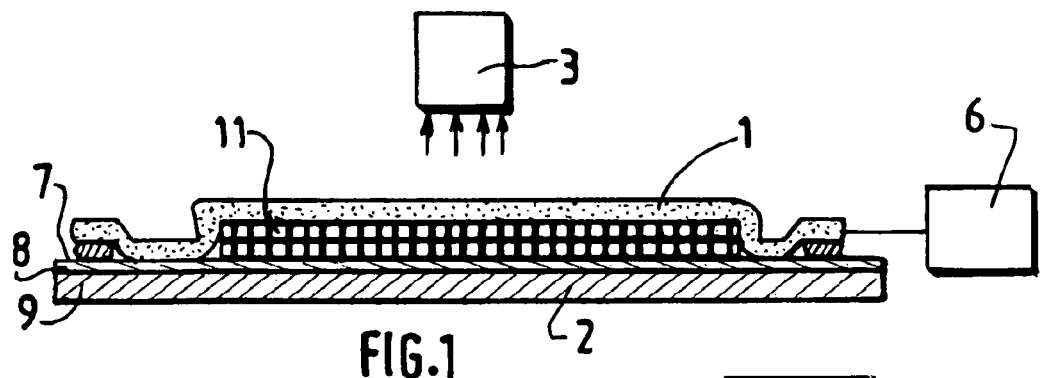
FIG. 1, a cross-section diagrammatical view of a molding device according to an embodiment wherein the membrane is planar.
Figure 2:
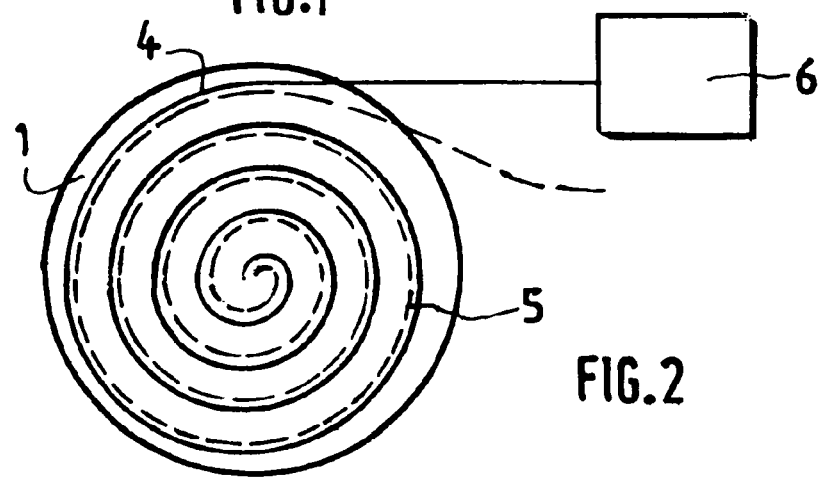
FIG. 2, a schematic top view of the membrane of the device of FIG. 1.

An embodiment of the device of FIGS. 1 and 2 allows for the manufacture of a curved part made from composite materials which is carried out using fabrics reinforced with natural fibers.

This device comprises a flexible membrane 1, a rigid portion 2, a suction member 3 which is here a pump.

The flexible membrane 1 is made of silicone. In this example, it has a thickness of approximately 5 mm. This membrane 1 comprises an inductor 4 which is here a copper cable wound in a coil and included in the plane of the membrane. This copper cable constituted of several wires has a diameter of approximately 2 mm and a conductivity of approximately $59.6 \times 10^8$ S/m. The conductor cable 4 is coupled to an alternating current generator 6, outside of the membrane. The membrane 1 further comprises a channel 5 which also forms a coil and wherein a cooling liquid such as water may flow.

The rigid portion 2 comprises an upper surface 7 which has reliefs corresponding to the desired shape for the part made from composite materials. The rigid portion 2 is coated with an electrically conductive layer 8 made of steel which is able to be heated under the influence of the variable magnetic field produced by the membrane. Under this heating layer 8 is located a insulating layer 9 which avoids heat losses. In an embodiment, this insulating layer 9 is made of ceramic.

The molding device according to an embodiment further comprises means of sealing 10 making it possible to provide the seal between the membrane and the rigid portion when the suction member thrusts the membrane against the rigid portion.

Figure 3:
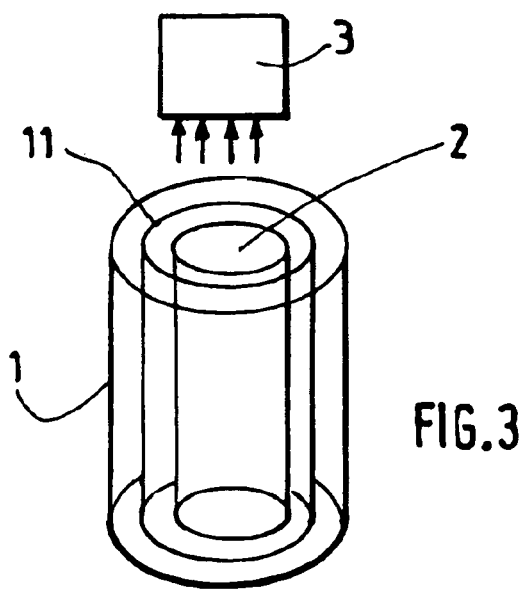
FIG. 3, a diagrammatical side view of a molding device according to an embodiment wherein the membrane is tubular.
Figure 4:
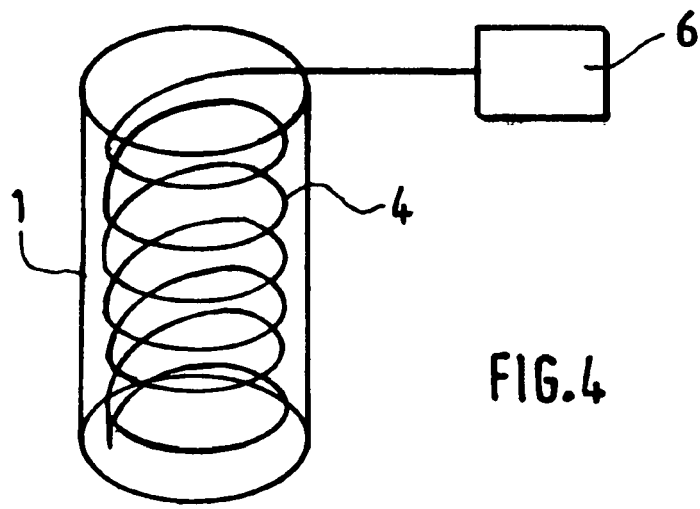
FIG. 4, a diagrammatical side view of the membrane of FIG. 3.

The device of FIGS. 3 and 4 further comprises a membrane 1, and a fixed portion 2 between which the fabric to be shaped 11 is placed. This device further comprises a suction member 3 and a generator 6 which generates an alternating current.

The membrane 1 is tubular and it comprises an inductor 4 which forms a solenoid.

Figure 5:
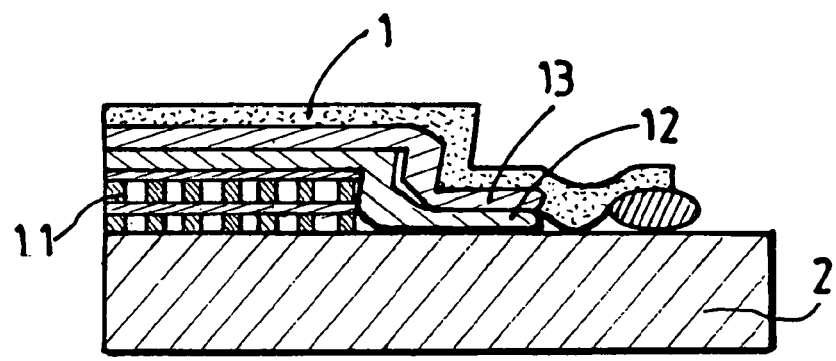
FIG. 5, a cross-section diagrammatical view of a molding device according to an embodiment.
Figure 6:
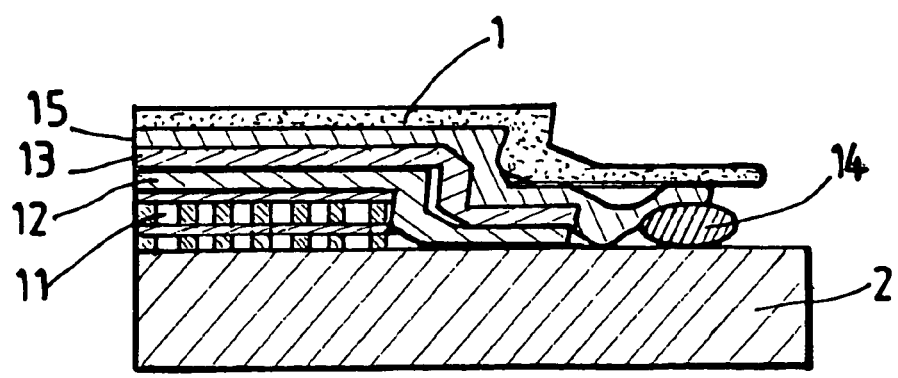
FIG. 6, a cross-section diagrammatical view of a molding device according to an embodiment.

FIGS. 5 and 6 show portions of an embodiment of a molding device which comprises a flexible membrane 1 provided with an inductor connected to a generator and a fixed portion 2. In this molding device is located a matrix 11 composed of a plurality of prepreg folds. Between the membrane 1 and the matrix 11 are located various consumables 12 and 13. These consumables 12, 13 may be of different natures according to the prepregs used and according to their melting temperature.

In the example embodiment of FIG. 5, the consumable 12 is a micro-perforated separator film which provides for the surface condition of the composite part and which allows the excess resin to creep through micro-holes. The consumable 13 is a drainage felt which makes it possible to absorb the excess resin which creeps during the heating and which migrates upwards via the action of the suction member. This drainage felt also provides the homogeneity of the placing in a vacuum. A third consumable may also be added: a delamination fabric which makes it possible to increase the roughness of the surface of the composite part in order to obtain a better adhesion during a possible gluing subsequently occurring.

In the example embodiment of FIG. 6, a mastic sealant 14 is installed on the outline of the tool. The latter makes it possible to compress the stack of the structure thanks to a vacuum film or a flexible membrane 15. In this configuration, the inductive membrane 1 is used only as a heating system and allows for a rise in temperature of the tool or of the stratified member if the latter is at least partially electrically conductive. This vacuum membrane may be manufactured from an elastic material in order to be able to hug the shape of the molding tool when the vacuum is applied.

Following is described an embodiment of a method of production of a part made from composite materials implementing one of the devices for molding of FIGS. 1 to 6.

In a first step, a release agent is applied on the rigid portion. Then the prepreg to be shaped is placed on the rigid portion. A semipreg in the form of a mixture, a coating, a chalking, a co-mixing, or a thermoplastic film may also be used. Said thermoplastic material may be selected from among polyethylethercetone, poly phenylene sulfone, polyethylene but also biopolymers of the polylactic, polyhydroxybutyrate acid type.

The reinforcement folds of the prepreg are then positioned according to the desired orientation. The orientation of the folds is selected according to the predefined mechanical characteristics.

The various consumables are installed on the prepreg in the following order: the delamination fabric, the separator film, the absorbing fabric and the drain. However, certain consumables are not indispensable and may be eliminated according to the desired characteristics. The consumables used have a decomposition temperature that is higher than that of the prepreg in order to not decompose during the heating.

The flexible membrane is then placed on the unit carried out via the installation of a mastic sealant or of any other suitable means of sealing.

A sufficient vacuum is then applied to the unit thanks to the suction member. The vacuum to be obtained is a vacuum of at least approximately 0.5 bars. In order to obtain the vacuum between the membrane and the rigid portion, vacuum uptakes are used. The latter may be located either on the membrane using one or several vacuum outputs, or via one or several orifices located in the mould.

The generator is then activated which produces an alternating current, which makes it possible to create a magnetic field thanks to the inductor. Thanks to this magnetic field, the rigid portion heats and the heat that it produces is transferred to the prepreg by means of conduction. The prepreg liquefies at its melting temperature and envelopes by the same the rigid portion. The heated prepreg forms the composite part on the rigid portion with the maintaining of the force generated by the flexible membrane on the rigid portion.

The prepreg is then cooled to a defined temperature, for example approximately 60° C., via a system of a stream of air which ventilates the upper portion of the device. This step fixes the final structural and dimensional characteristics of the composite part as well as its final appearance.

A method of producing a part made from composite materials is accelerated thanks to the molding device according to an embodiment. For example, the carrying out of a part made from composite materials using four folds of prepreg made of polyamide reinforced with carbon fibers at approximately 250° C. lasts three minutes with the molding device according to an embodiment which is provided with a generator with a power of approximately 2000 W, and which operates at a frequency of approximately 20 kHz.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. Molding device for producing parts made from composite materials, the device comprising:
   a deformable membrane;
   a rigid portion;
   a suction device creating a vacuum between the membrane and the rigid portion, wherein the deformable membrane comprises at least one inductor connected to a power supply casing, the inductor constituted of at least one flexible duct in which a ferrofluid circulates; and, the rigid portion is at least partially electrically conductive.

2. Molding device as claimed in claim 1, wherein: the membrane is non-developable, and, the inductor defines a coil included in the thickness of the membrane.

3. Molding device according to claim 1, wherein the membrane is tubular and the inductor defines a solenoid.

4. Molding device as claimed in claim 1, wherein the membrane is elastic.

5. Molding device as claimed in claim 1, wherein the membrane further comprises means of cooling.

6. Molding device as claimed in claim 1, wherein only a surface of the rigid portion is electrically conductive.

7. Molding device as claimed in claim 6, wherein the rigid portion comprises a thermally insulating layer arranged under the surface of the rigid portion which is electrically conductive.

8. Molding device as claimed in claim 1, wherein the rigid portion is constituted of a magnetic material.

9. Molding device as claimed in claim 1, wherein the rigid portion is coated with a magnetic material.

10. Molding device as claimed in claim 1, further comprising means of sealing for sealing together the membrane and the rigid portion when the means of suction creates vacuum.

11. Molding device as claimed in claim 1, further comprising thermocouples for measuring the temperature of the composite material and a servo circuit that adjusts the frequency of the power supply according to the temperature of composite material.

12. A molding device comprising:
   a deformable tubular membrane comprising at least one solenoid connected to a power supply casing;
   a rigid portion that is at least partially electrically conductive; and
   a suction device creating a vacuum between the membrane and the rigid portion.

13. Molding device as claimed in claim 1, wherein the membrane further comprises at least one of electrically conductive particles or electrically conductive fluids.

* * * * *